United States Patent [19]

Macomber

[11] Patent Number: 5,154,273
[45] Date of Patent: Oct. 13, 1992

[54] PLATFORM CONVEYOR

[75] Inventor: Robert A. Macomber, Agoura, Calif.

[73] Assignee: Socio Tec Integrators, Inc., Agoura Hills, Calif.

[21] Appl. No.: 798,536

[22] Filed: Nov. 26, 1991

[51] Int. Cl.$^5$ .......................................... B65G 17/16
[52] U.S. Cl. ................................. 198/321; 198/793
[58] Field of Search ............................... 198/793, 321

[56] References Cited

U.S. PATENT DOCUMENTS

| | | | |
|---|---|---|---|
| 2,666,519 | 1/1954 | Boots | 198/793 X |
| 3,319,038 | 5/1967 | Meister et al. | 198/793 X |
| 3,384,097 | 5/1968 | Meeker et al. | 198/793 X |
| 3,517,799 | 6/1970 | Gartner et al. | 198/793 |
| 3,550,755 | 12/1970 | Noren | 198/793 X |
| 4,736,787 | 4/1988 | McMellon | 198/793 X |
| 4,765,440 | 8/1988 | Tashman | 198/793 X |

FOREIGN PATENT DOCUMENTS

| | | | |
|---|---|---|---|
| 0299108 | 12/1989 | Japan | 198/793 |
| 0299109 | 12/1989 | Japan | 198/793 |

*Primary Examiner*—D. Glenn Dayoan
*Attorney, Agent, or Firm*—Lloyd M. Forster

[57] ABSTRACT

A floor mounted inside chain loop carousel conveyor with chain pivots at the inside corners of successive rectangular platforms and with use of spanning "butterfly" bifold guards comprising a pair of identical triangular sides with upper edges pivotally connected to each other and lower edges pivotally connected respectively to adjacent sides at successive platforms. All three pivotal connection seams are equipped with piano-type hinges. The "butterfly" bifold guards, when extended in passing around curved sections of the conveyor provide a bridge higher than, rather than flush with the platform so as to provide a structurally rigid personnel guard.

7 Claims, 3 Drawing Sheets

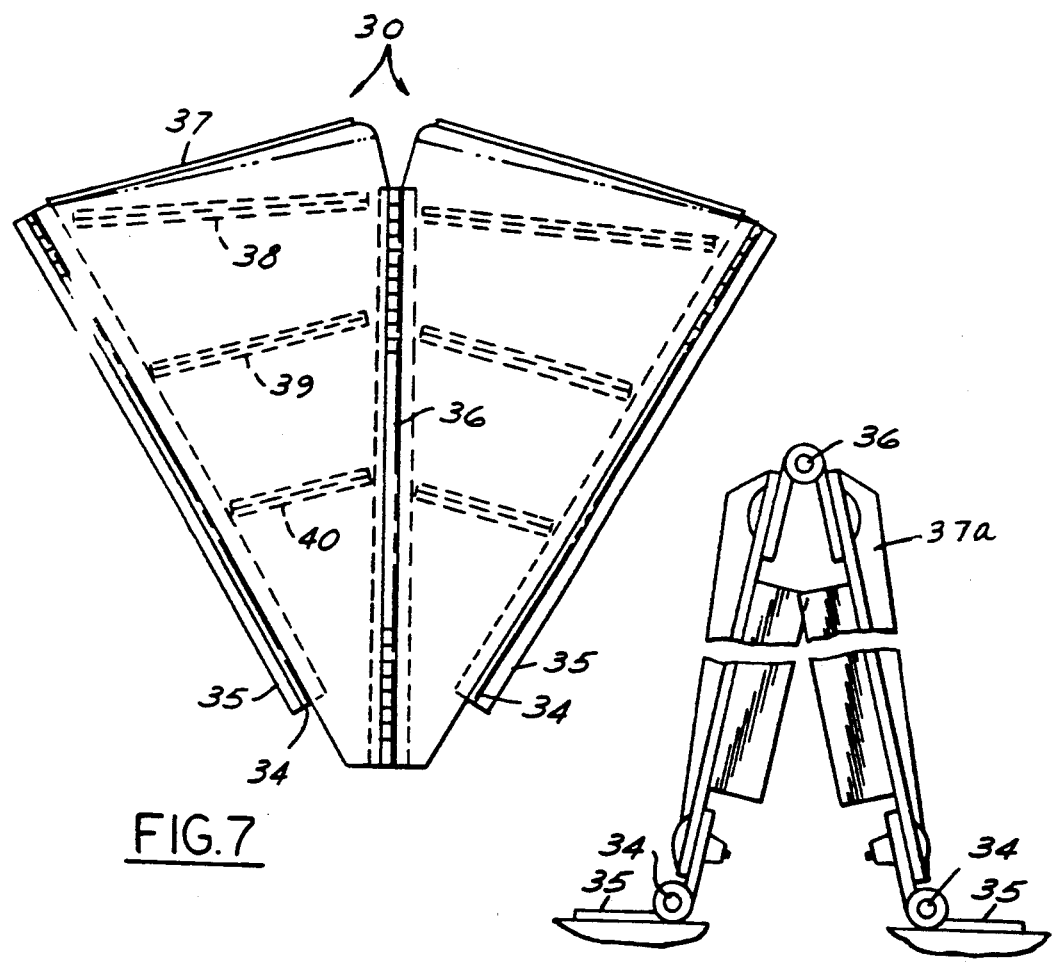
FIG. 7
FIG. 8
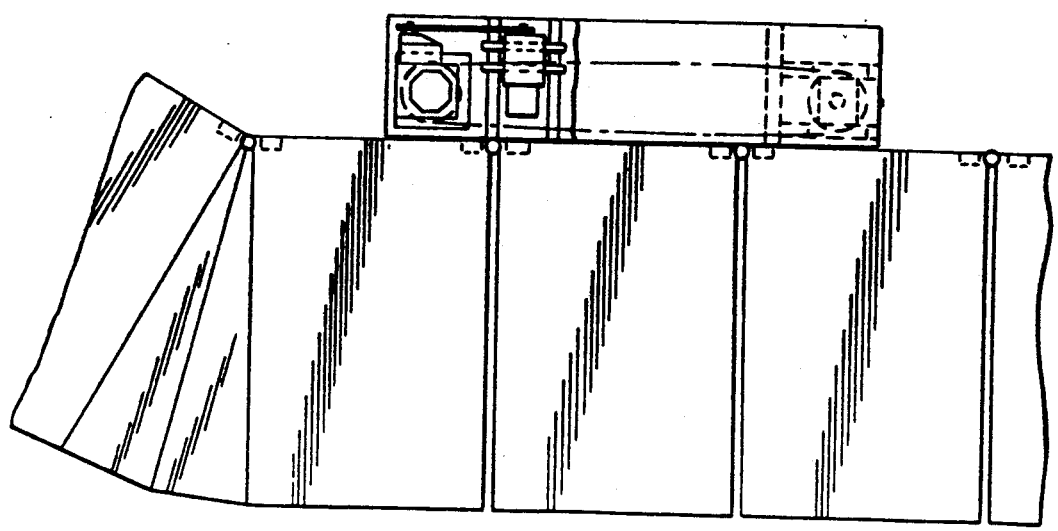
FIG. 9

PLATFORM CONVEYOR

BACKGROUND OF THE INVENTION

Articulated trains or conveyors of carriers, platforms, tables, cars or the like travel predetermined paths and frequently require provision for accommodating angular change between adjacent components of the train. U.S. Pat. No. 1,039,585 discloses railway cars constructed with a plurality of pivotally connected sections, so arranged as to provide a continuous interior in the manner of an accordian. U.S. Pat. No. 2,219,724 discloses a sorting table or the like in somewhat oval form, the top of which provides an endless track in a horizontal plane for a conveyor comprising a series of slats connected to a chain. The slats are partially overlapping so that as they are carried along the track by the train into a curve, the slats can spread out fan-wise at their outer ends without leaving a gap therebetween. U.S. Pat. No. 2,666,519 discloses a food serving conveyor in which carriages move in procession around a track, each provided with a polygonal plate having overlapping adjacent relation to the plate next following to provide the effect of a continuous moving platform. U.S. Pat. No. 3,881,592 discloses a modular baggage handling system with chain drive, wherein a continuous train of wheeled modular carriers, which follow a predetermined path created by guide rails, have plates which overlap each other so that free portions of the plate move toward and away from the base of the carrier as each plate moves around, turns and proceeds to the straight portions.

BRIEF DESCRIPTION OF THE PRESENT INVENTION

Floor supported rectangular carousel conveyor platforms are each driven at both corners of one end by an elongated link conveyor chain. Adjacent sides of each platform open from a close parallel relation in straight runs of the conveyor to an angular relation in rounding semi-circular curved conveyor ends. A bifold pair of triangular guards are respectively pivotally connected at bottom edges to each adjacent platform side and at top edges to each other so as to extend vertically in close parallel relation in straight runs of the conveyor and open to a bridging relation in rounding the ends of the conveyor. The fixed apex angle of each pivoted triangular side is greater than one half the maximum included angle between the adjacent platform sides so as to provide a bridging relation capable of supporting the weight of conveyed objects or personnel which might accidentally fall against the panels while traveling around the conveyor ends.

In a specific application of the conveyor, each platform is employed as a moving assembly area for one person, an assembly fixture, and components to be assembled.

BRIEF DESCRIPTION OF THE DRAWINGS

FIG. 7 is a plan view of a pair of triangular bifold guards employed in the conveyor; and FIG. 8 is an end view of the bifold guards in a near upright condition as typically installed on a pair of adjacent caster pallet frames.

FIG. 9 is a fragmentary plan view schematically illustrating a conveyor chain drive at an inside straight section.

DETAILED DESCRIPTION OF PREFERRED EMBODIMENT

Figure 1:
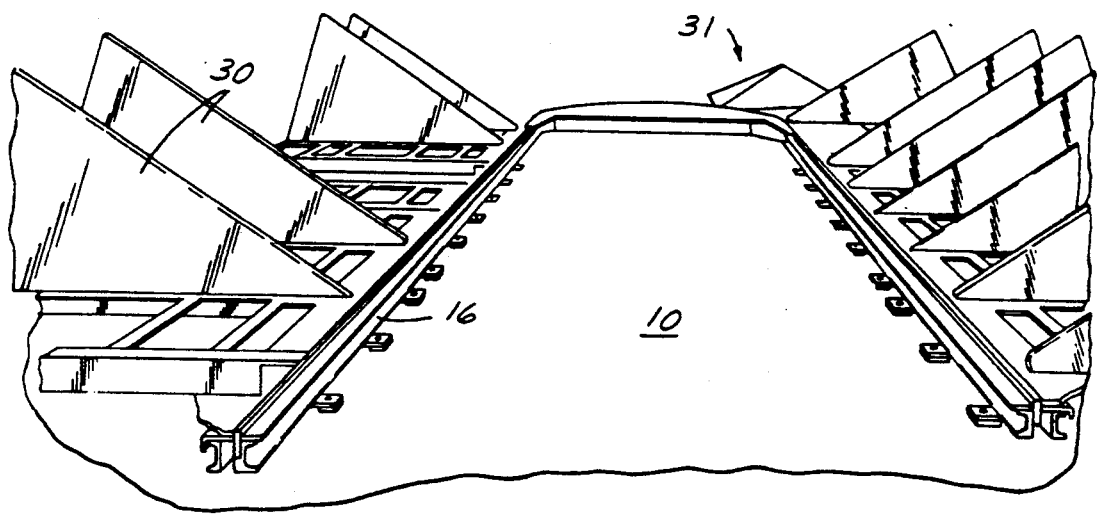
FIG. 1 is a perspective view of a floor mounted inside chain loop carousel conveyor under construction.
Figure 5:
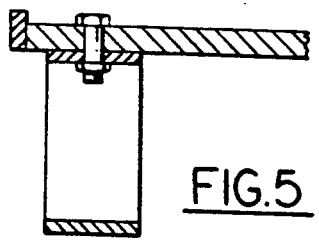
FIG. 5 is a fragmentary sectional view taken along the line 5—5 of FIG. 3.

With reference to FIGS. 1-5, the illustrated platform assembly carousel of the present invention, shown under construction with platform decks and certain other elements omitted, is mounted on floor 10 with inner track 11 having inner and outer lateral extensions 12 and 13, supported on leveling shims 14, anchored to the floor through bolts 15. Longitudinal guide rails 16 mounted on extensions 12 conduct conveyor chain 17 around a carousel path for transporting floor mounted platform frames 18 driven at their inside corners 19.

Figure 2:
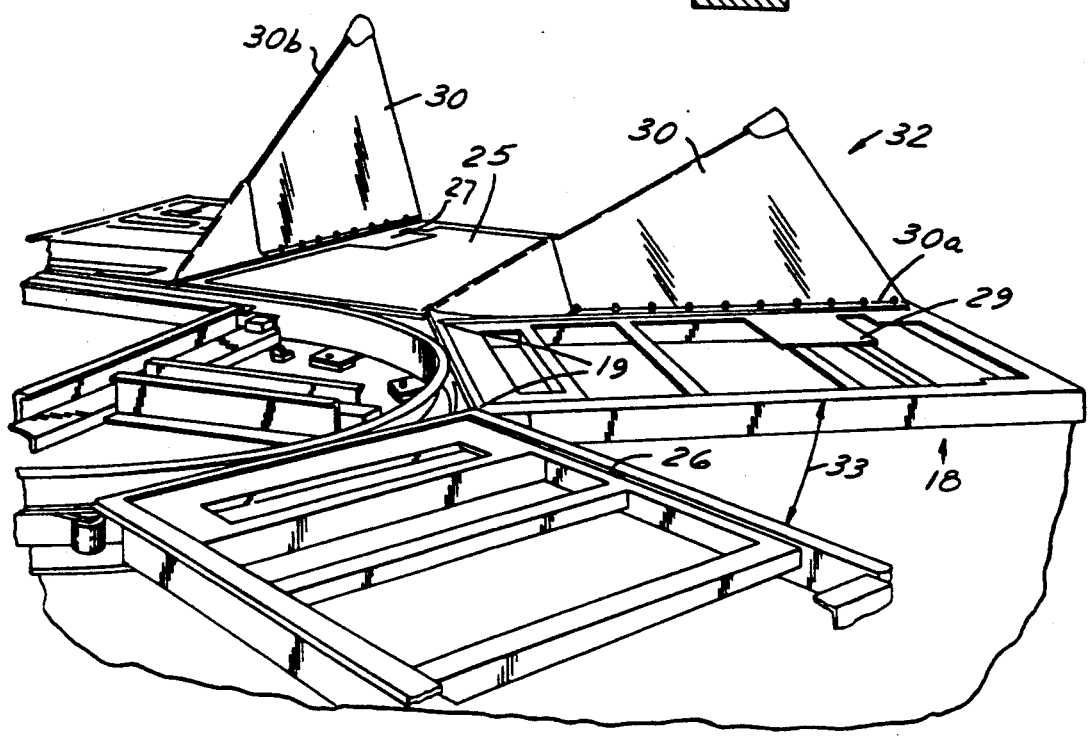
FIG. 2 is a perspective view of a curved end of the conveyor.
Figure 3:
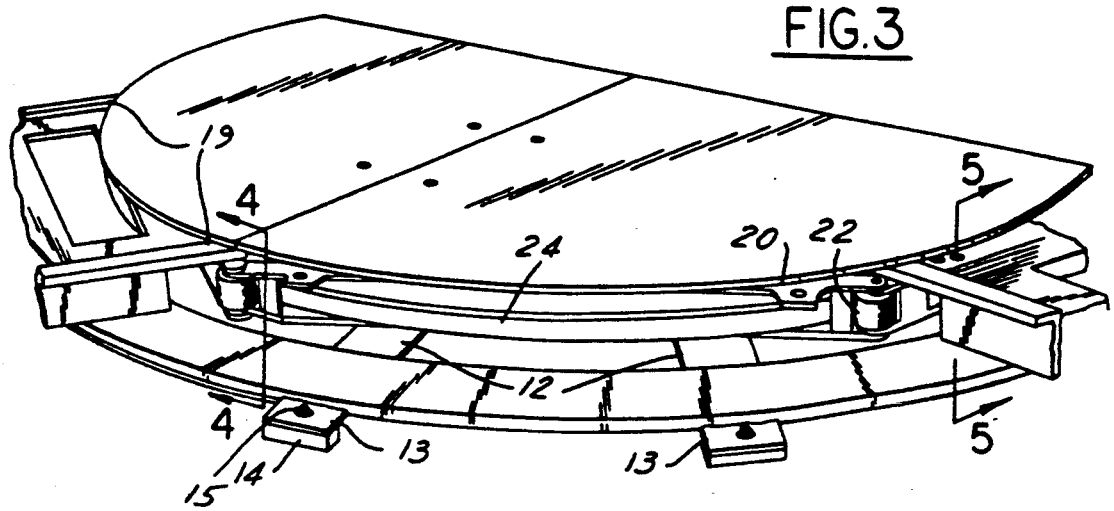
FIG. 3 is a perspective view illustrating the chordal platform end.
Figure 4:
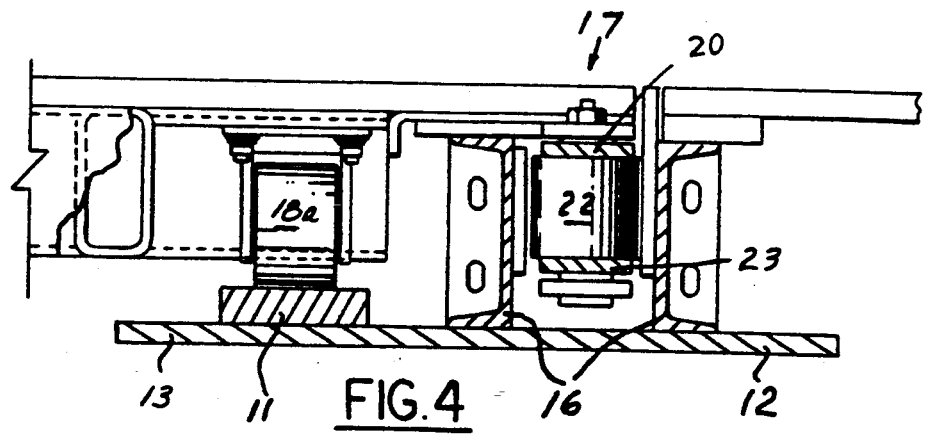
FIG. 4 is a fragmentary sectional view taken along the line 4—4 of FIG. 3.

Each platform frame 18 has its inside corners 19 connected to an upper link 20 of conveyor chain 17, pivotally connected to chain rollers 22, which are also pivotally connected to lower chain links 23. Elongated links 20 and 23 span arcuate segments 24 of the guide track in a chordal manner as best shown in FIG. 3. Each platform frame 18 is supported on wheels 18a riding on track 11 at the inner end of the platform and on a similar track, not shown, at the outer end of each platform. A platform deck 25, as illustrated in FIG. 2, constructed of plywood or other appropriate material is mounted on each platform frame 18, nested within recess borders 26. Cutouts 27 are provided for direct mounting of an assembly fixture 28, such as shown in FIG. 6, to a rigid fixture base 29.

A pair of triangular bifold "butterfly" guards 30 are respectively connected at their lower edges 30a to adjacent sides of successive platform frames and to each other at their top margin 30b to provide an upright separation between platforms along the straight run sides of the conveyor and to open as a covering guard for the angular separation of platforms in rounding a curve, as best shown at 31 in FIG. 1, and shown partially opened at 32 in FIG. 2. The triangular construction of the bifold sides, with an angle exceeding one half the maximum angular separation 33, shown in FIG. 2 provides a bridging guard against article or personnel accidentally falling or stepping within the angular separation between the frames while rounding the end curves of the carousel. Appropriately rigid bifold material, preferably reinforced sheet metal, provides such protection without potential of damage during intended use.

With reference to FIGS. 7 and 8, typical "butterfly" bifold construction includes lower edge piano hinges 34 with mounting extensions 35 for connection to each adjacent side of successive platform frames, and piano hinge 36 for connecting the top edges of the bifold sides. A pinch top single lip trim bar 37 is provided at the base of each triangle to cover the sharp shear edge of the sheet metal. Reinforcement and safety "opening" is accomplished with a "break" flare 37a in the area of trim bar 37. Intermediate reinforcement bars 38, 39 and 40 provide additional rigidity to each side.

Figure 6:
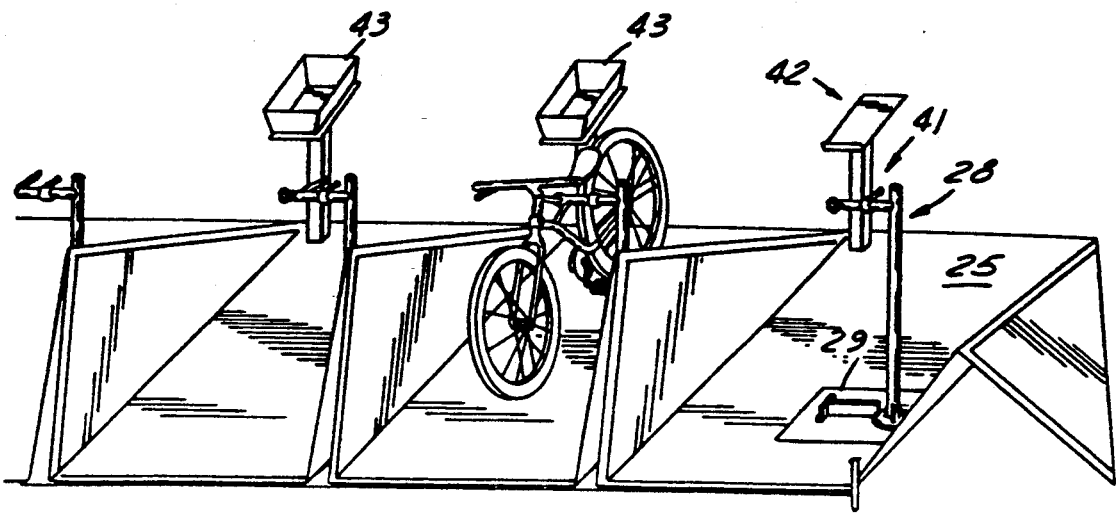
FIG. 6 is a schematic perspective view illustrating the conveyor employed in a manual bicycle assembly system.

With reference to FIG. 6, a typical end use for manual assembly of bicycles is schematically illustrated with fixture 28, fixture base 29, bicycle frame clamp 41 and stand 42 for detail component kit box 43. Platform deck 25 is of appropriate dimension for an assembly operator, not shown, to complete, or a desired portion of, the assembly of a bicycle during continuous movement of the conveyor through one cycle between loading and unloading stations.

The comparative efficiency of the system derives from each assembly operator having a responsibility for a defined portion of the complete assembly, with resulting interest exceeding subdivided limited assembly operations of a repetitive and boring nature; from the relatively stationary relation of the assembly fixture and operator moving together on the conveyor platform, as distinguished from a series of stationary operators performing assembly operations on a moving bicycle, or alternatively walking along with the bicycle with return walking to the beginning of each assembly operation; from the possibility of basic product loading and kitting performed at a single loading station, as well as completed bicycle unloading from the same or adjacent station.

The carousel platform, as a loop, with safe means of transport around the angular turns, will provide for the assembly work content to be split up between one, two or teams of people performing a defined portion of the total assembly task to be performed on the conveyor.

While the above described embodiment discloses a platform adapted for a single operator, it will be understood that the same concept may be implemented with larger platforms adapted for plurality teams of operators with "butterfly" bifolds of appropriate size and construction to provide the same safety guard function.

The bifold guard will provide a physical personnel barrier along the straight run of the conveyor which can be a positive aspect of the total system, relative to the work space definition, due to the fact that the personnel travel routes will primarily be across the width of the conveyor which is compatible with the platform guards.

I claim:

1. Floor mounted multiple platform carousel conveyor extending along straight and curved sections comprising contiguous straight sided platforms, platform inner end drive means providing a variable angle opening between adjacent platform sides in following said path, means for covering said opening including bifurcated triangular intermediate panel elements pivotally connected respectively to said adjacent sides and to each other bridging the variable sector space within said variable angle opening.

2. Conveyor of claim 1 wherein said panel elements are in substantially parallel upright relation along straight sections of said path and an open angular relation along curved portions of said path.

3. Conveyor of claim 2 wherein each of said panels has equal fixed included angle pivoted sides greater than one half of the maximum included angle between adjacent platform sides in rounding said curved portions of said path.

4. Conveyor of claim 3 wherein said panels are constructed with means of adequate strength to protect against intrusion of objects or personnel being conveyed on said platforms.

5. Conveyor of claim 4 wherein said straight sided platforms are recta-linear platforms each driven at the corners of one end by said drive means, said drive means including a single elongated link of a continuous chain conveyor.

6. Conveyor of claim 5 including floor supported platform wheels.

7. Conveyor of claim 6 including floor mounted tracks engaged by said platform wheels.

* * * * *